United States Patent
Cheng et al.

[11] Patent Number: 6,154,638
[45] Date of Patent: Nov. 28, 2000

[54] METHODS AND APPARATUS FOR DETERMINING FORWARD AND REVERSE LINK PERFORMANCE IN A WIRELESS COMMUNICATION SYSTEM

[75] Inventors: Terry Si-Fong Cheng, Randolph; Asif Dawoodi Gandhi, Summit, both of N.J.

[73] Assignee: Lucent Technologies Inc., Murray Hill, N.J.

[21] Appl. No.: 09/008,255

[22] Filed: Jan. 16, 1998

[51] Int. Cl.⁷ .................................................. H04B 17/00
[52] U.S. Cl. ........................................ 455/67.1; 455/67.4
[58] Field of Search ................. 455/67.1, 67.4, 455/423, 15, 522, 249.1; 370/342, 318, 441, 310, 320, 335; 324/76.11, 616

[56] References Cited

U.S. PATENT DOCUMENTS

| | | | |
|---|---|---|---|
| 5,056,109 | 10/1991 | Gilhousen et al. | 375/1 |
| 5,475,870 | 12/1995 | Weaver, Jr. et al. | 455/67.1 |
| 5,584,049 | 12/1996 | Weaver, Jr. et al. | 455/67.1 |
| 5,669,066 | 9/1997 | Borg et al. | 455/69 |
| 5,884,187 | 3/1999 | Ziv et al. | 455/522 |

*Primary Examiner*—Nguyen Vo
*Assistant Examiner*—N. Mehrpour
*Attorney, Agent, or Firm*—Ryan, Mason & Lewis, LLP

[57] ABSTRACT

Link performance is measured in a code division multiple access (CDMA) personal communication service (PCS) or cellular system, or other type of wireless system, using a test set-up which permits the simulation of various changes in system configuration. An illustrative embodiment includes a first attenuator arranged in a common portion of a receive path and a transmit path of a mobile station of the system, and a second attenuator arranged in either a receive-only portion of the receive path or a transmit-only portion of the transmit path. The amounts of attenuation provided by the first and second attenuators are decoupled such that a different amount of attenuation can be provided on the transmit path than on the receive path. Performance of forward and reverse links of the system are measured while varying a value of at least one of the first or second attenuators. For a given measurement, the attenuator values may be selected to simulate performance of the system in a configuration in which base station amplifier power is increased or decreased. As another example, the attenuator values may be selected to simulate performance of the system in a configuration in which cell size is increased. This arrangement of decoupled forward and reverse link attenuation in accordance with the invention permits efficient and accurate determination of link balance conditions.

23 Claims, 7 Drawing Sheets

FIG. 4A — CASE A: 8 WATT AMPLIFIER (PAD=10dB)

$$\frac{Ec}{Io} = \frac{Sf1}{\left[\begin{array}{c}S1+S2+S3+S4\\+\ldots+TH.NOISE\end{array}\right]}$$

FIG. 4B — CASE B: 16 WATT AMPLIFIER (PAD=10dB)

$$\frac{Ec}{Io} = \frac{2*Sf1}{\left[\begin{array}{c}2*(S1+S2+\\S3+S4+\ldots)+\\THERMAL\ NOISE\end{array}\right]}$$

FIG. 4C — CASE C: 8 WATT AMPLIFIER (PAD=7dB)

$$\frac{Ec}{Io} = \frac{2*Sf1}{\left[\begin{array}{c}2*(S1+S2+\\S3+S4+\ldots)+\\THERMAL\ NOISE\end{array}\right]}$$

METHODS AND APPARATUS FOR DETERMINING FORWARD AND REVERSE LINK PERFORMANCE IN A WIRELESS COMMUNICATION SYSTEM

FIELD OF THE INVENTION

The present invention relates generally to wireless communication systems and more particularly to techniques for estimating link balance, effects on performance of an increase in base station transmitted power, and other performance conditions in a wireless code division multiple access (CDMA) system.

BACKGROUND OF THE INVENTION

Effective implementation and use of wireless communication systems, such as code division multiple access (CDMA) Personal Communications Service (PCS) systems based on the IS-95 standard, requires accurate measurement of forward and reverse link performance. A CDMA PCS system is typically designed by computing cell coverage based on mobile transmit power constraints, and by ensuring that the forward (i.e., base-to-mobile) link renders the mobile receivers substantially interference limited within the cell. In such systems, it may be desirable to determine the effect of a particular change in system configuration on the forward and reverse links. For example, in a system in which the base stations are set to 1.2 Watts of pilot power (i.e., they utilize 15% of the available power of an amplifier with 8 Watts of long term average power) for signal transmission, a question may arise as to whether or not system performance and/or capacity can be improved by increasing the size of the amplifiers to provide 16 Watts of long term average power. Other questions which may arise include whether or not the cell size could be increased in a given system while still providing desired performance and capacity levels.

Unfortunately, conventional link measurement techniques are unable to simulate these and other changes in system configuration. Such techniques are, for example, unable to modify a test mobile station in a manner which has substantially the same effect on performance and capacity as an actual system-wide increase in base station amplifier power or an actual increase in system cell size. As a result, conventional techniques make it very difficult if not impossible to determine accurately and efficiently whether or not a particular change in system configuration will produce the desired performance and capacity results. Furthermore, these techniques fail to take into account the dynamic nature of a CDMA system, and the fact that the issue of link balance in a CDMA system can be position dependent. The conventional techniques therefore do not provide a sufficiently accurate indication of link balance between forward and reverse links.

As is apparent from the above, a need exists for improved techniques for measuring forward and reverse link performance in a wireless communication system, such that an accurate indication of link balance can be obtained without the need for costly and time-consuming system reconfiguration.

SUMMARY OF THE INVENTION

The invention provides methods and apparatus for measuring forward and reverse link performance and determining link balance in a wireless communication system. An illustrative embodiment of the invention is an apparatus which permits the simulation of various changes in system configuration. The apparatus includes a first attenuator in a common portion of a receive path and a transmit path of a mobile station of the system, and a second attenuator in either a transmit-only portion of the transmit path or a receive-only portion of the receive path. This arrangement of attenuators effectively decouples the amount of attenuation provided on the forward (i.e., base-to-mobile) link from that provided on the reverse (i.e., mobile-to-base) link. Performance of the links can then be independently measured, thereby allowing an accurate and efficient determination of link balance. In one possible implementation of this embodiment, the decoupling is provided through the use of a circulator connected between a mobile receiver and a mobile antenna in the apparatus. The first attenuator is connected in the common portion of the receive and transmit paths between the circulator and the antenna, and the second attenuator is connected in either a receive-only or transmit-only path provided in parallel with the circulator. Other decoupling mechanisms may also be used to decouple the amount of attenuation provided for the forward and reverse links.

The invention can be used to simulate various alternative configurations for an existing system. For example, the attenuator values can be selected to simulate performance of the system in a configuration in which base station amplifier power is altered relative to that of an existing system configuration. Similarly, the attenuator values can be selected to simulate performance of the system in a configuration in which cell size is increased relative to that of an existing system configuration. Other configuration changes could also be simulated using the techniques of the invention.

Although particularly well suited for use in conjunction with CDMA PCS systems, the invention can be implemented in a wide variety of other types of wireless communication systems. The invention provides efficient and accurate link measurements and link balance indications for changes in system configuration, without the need for costly, time-consuming and in many cases highly impractical actual system reconfiguration. These and other features and advantages of the present invention will become more apparent from the accompanying drawings and the following detailed description.

DETAILED DESCRIPTION OF THE INVENTION

The present invention will be illustrated below in conjunction with an exemplary IS-95 code division multiple access (CDMA) wireless communication system. It should be understood, however, that the invention is not limited to use with any particular type of communication system, but is instead more generally applicable to any wireless system in which it is desirable to provide accurate and efficient link performance measurements. For example, although the techniques are illustrated with reference to IS-95 CDMA cellular and personal communications service (PCS) systems, it will be apparent to those skilled in the art that the techniques are also applicable to other CDMA systems, as well as to other types of wideband and narrowband wireless systems. The term "forward link" refers generally to a base-to-mobile communication link, while the term "reverse link" refers generally to a mobile-to-base communication link. The term "attenuator" as used herein should be understood to include fixed or variable attenuator pads as well any other type of fixed or variable attenuation device.

Figure 1:
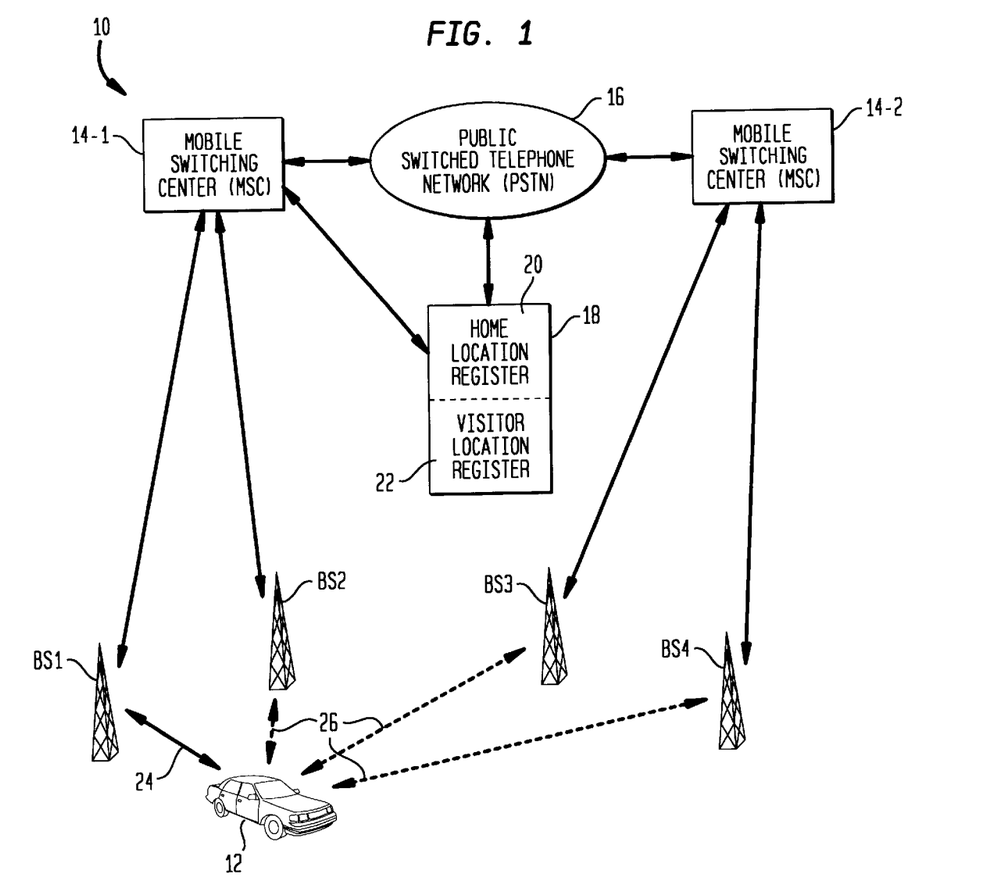
FIG. 1 shows an exemplary code division multiple access (CDMA) wireless communication system in which the link performance measurement techniques of the invention may be implemented.

FIG. 1 shows an exemplary cellular or (PCS) system 10 in which the invention may be implemented. The system 10 is configured in accordance with TIA/ELA/AIS-95A, "Mobile Station—Base Station Compatibility Standard for Dual-Mode Wideband Spread Spectrum Cellular System," Jun. 1996, and ANSI J-STD-008, "Personal Station—Base Station Compatibility Requirements for 1.8 to 2.0 GHz Code Division Multiple Access (CDMA) Personal Communication Systems," both of which are incorporated by reference herein. The system 10 includes a mobile station (MS) 12 and a number of base stations BS1, BS2, BS3 and BS4. The base station BS1 of FIG. 1 represents a primary base station, communicating with mobile station 12 via the path designated by solid arrow 24. The primary base station BS1 communicates with the mobile station 12 using CDMA techniques described in the above-cited standards documents. As the mobile station 12 moves within the system 10, handoffs may occur such that base stations other than BS1 become primary base stations for communicating with the mobile station 12. For example, a communication involving mobile station 12 may be handed off from BS 1 to one of the base stations BS2, BS3 and BS4 as the mobile station 12 moves through the system. The mobile station 12 receives pilot signals from and communicates hand-off related information to these other base stations via the paths indicated by dashed arrows 26.

The CDMA PCS system 10 also includes first and second mobile switching centers (MSCs) 14-1 and 14-2. A given MSC typically connects several BSs with a public switched telephone network (PSTN) 16. In this exemplary embodiment, MSC 14-1 connects base stations BS1 and BS2 with the PSTN 16 and MSC 14-2 connects base stations BS3 and BS4 with the PSTN 16. The system 10 also includes a memory 18 having a number of registers including a home location register (HLR) 20 and a visitor location register (VLR) 22. The HLR 20 and VLR 22 store user data and billing information for each mobile station 12 of the system 10.

Figure 2:
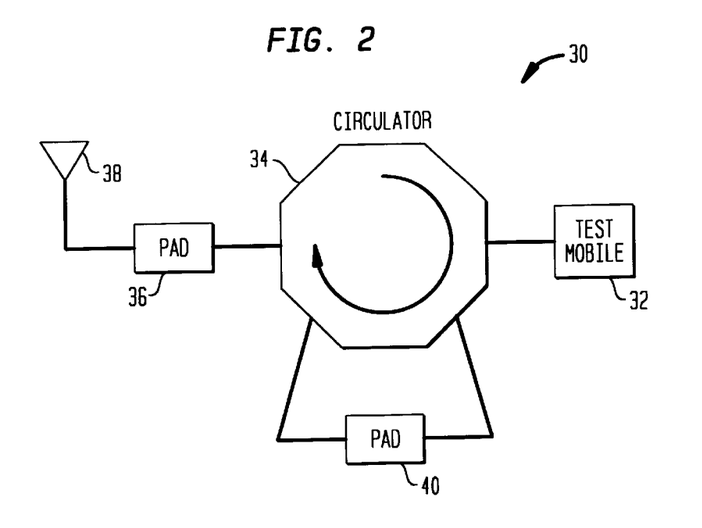
FIG. 2 shows an exemplary link balance test set-up in accordance with an exemplary embodiment of the invention.

FIG. 2 illustrates an exemplary test set-up 30 for implementing a link balance measurement in accordance with the invention. As noted above, a CDMA system such as that shown in FIG. 1 is typically designed by computing cell coverage based on mobile transmit power constraints, and then ensuring that the forward link renders mobile receivers substantially interference limited within the cell. A given link in a CDMA system can be artificially stressed by placing variable attenuators at a test mobile station. Variable or fixed attenuators will generally be referred to herein as attenuator pads or simply pads. The test set-up 30 of FIG. 2 includes a test mobile station 32 with a circulator 34 and an antenna 38. A common-path pad 36 is coupled between the antenna 38 and one port of the circulator 34. The common-path pad 36 is thus arranged in a common portion of the transmit and receive paths in test set-up 30. The common-path pad 36 serves to adjust the total received power (i.e., signal plus interference) in a manner consistent with system-wide use of base station transmit amplifiers with either higher power or lower power. The common-path pad 36 also serves to increase the reverse link path loss, and can therefore be used to simulate an increase in system cell size. A single-path pad 40 is coupled to other ports of the circulator 34 so as to provide an additional path loss in a single path (i.e., either a transmit-only path or a receive-only path, but not both), beyond that provided by the common-path pad 36, between the test mobile 32 and the antenna 38. Coupling the single-path pad 40 with the circulator 34 as shown allows either the reverse link path loss or the forward link path loss to be increased without affecting the path loss on the other link. Thus, different amounts of attenuation can be provided for the forward and reverse links in the test set-up 30.

Figure 3:
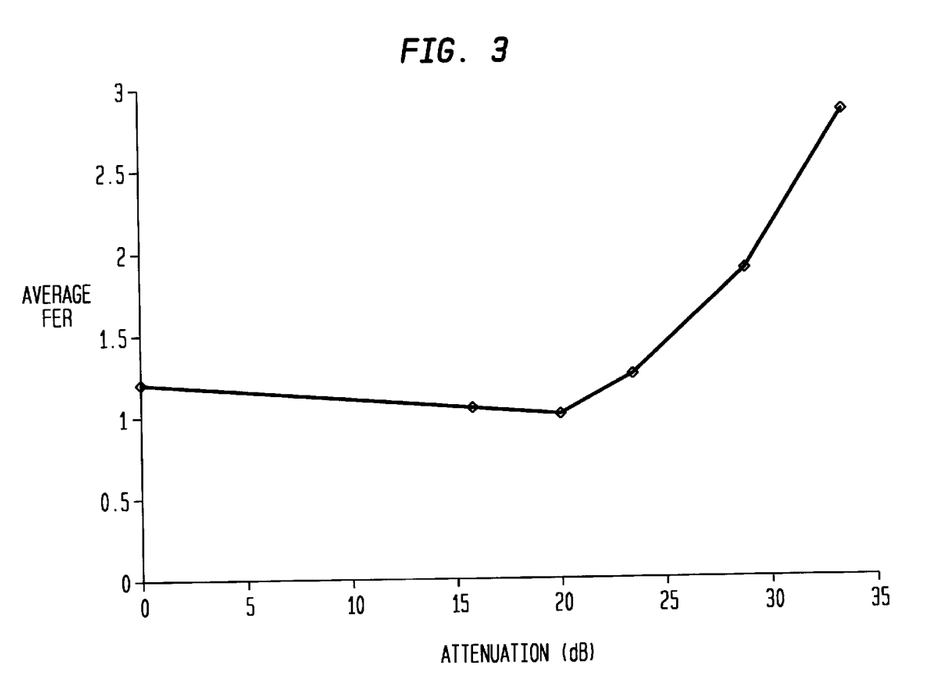
FIG. 3 is a plot of average frame error rate (FER) as a function of attenuation values in an exemplary forward link performance measurement in accordance with the invention.

FIG. 3 is a plot showing exemplary forward link performance as measured using the test set-up 30 of FIG. 2. The plot shows the forward link performance in terms of frame error rate (FER) as a function of the receive path attenuation value in decibels (dB). It can be seen from the plot that the average FER for the forward link is between about 1.0 and 1.2 for receive path attenuation values between about 0 dB and 20 dB. However, the link performance begins to degrade significantly for receive path attenuation values of about 25 dB or more. Varying the amount of receive path attenuation provided by the test set-up 30 can thus be used to characterize the performance of the forward link. Similarly, varying the amount of transmit path attenuation provided by the test set-up 30 can be used to characterize the performance of the reverse link.

Figure 4A:
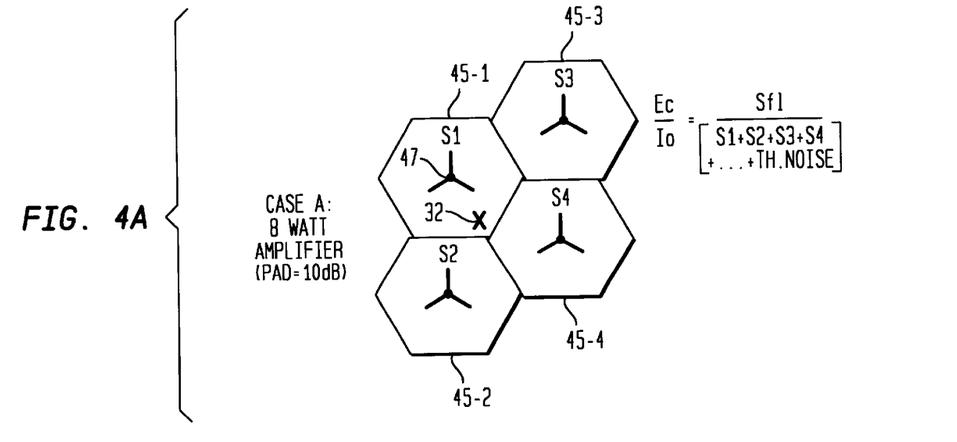
FIGS. 4A—4C illustrate the manner in which attenuation values may be used to simulate different system configurations using the techniques of the invention.
Figure 4B:
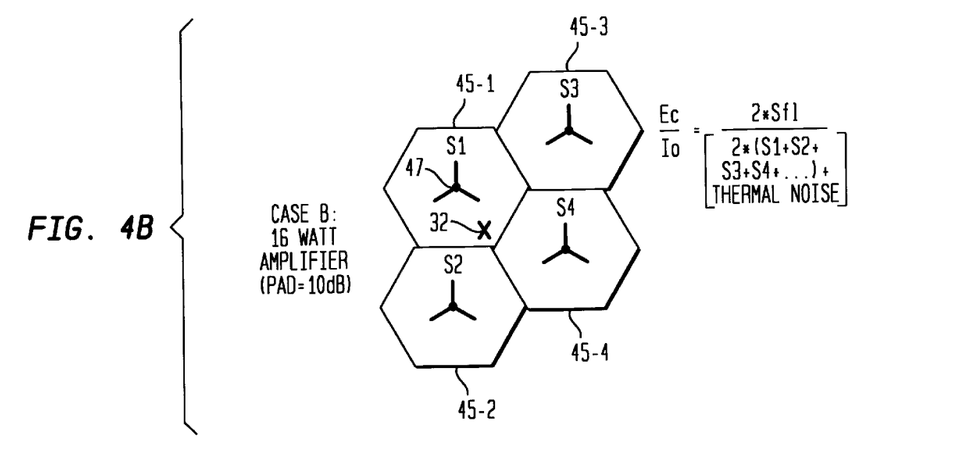
Figure 4C:
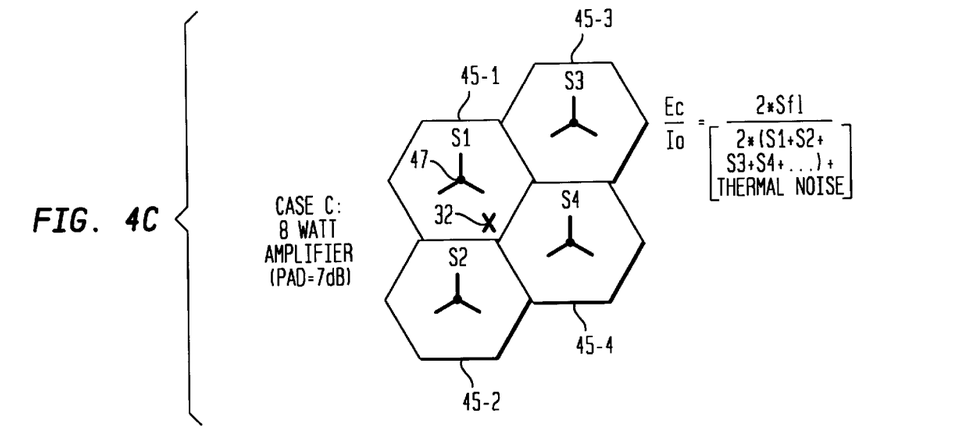

FIGS. 4A–4C illustrate how variations in the receive path attenuation value can serve to adjust the total received power at the test mobile 32 in a manner consistent with system-wide use of amplifiers of a particular power level. Each of FIGS. 4A–4C show four exemplary cells 45-1, 45-2, 45-3 and 45-4 of an N-cell system. The cells 45-$i$ are illustrated as having a hexagonal shape. Each of the cells 45-$i$ includes a base station 47 with a three-sector directional antenna. The base stations 47 in the cells 45-$i$ communicate with signals transmitted in sectors S1, S2, S3 and S4 as well as other sectors not specifically enumerated. All of the sectors in this example share the same frequency. The test mobile 32 is assumed to be in cell 45-1 at the location indicated by the X. FIG. 4A shows Case A, in which each of the base stations in the cells 45-$i$ is assumed to include an 8 Watt long term average power amplifier, and the total receive path attenuation value in the test set-up of FIG. 2 is set to 10 dB. The signal-to-interference ratio $E_c/I_0$ at the test mobile 32 for sector S1 in Case A is given by:

$$\frac{E_c}{I_0} = \frac{Sf1}{(S1 + S2 + S3 + S4 + \ldots + \text{Thermal Noise})}$$

in which Sf1 refers to the power of a sector S1 pilot signal received at the test mobile 32 over the forward link, and Si refers to the total power received at the test mobile 32 from the ith sector. FIG. 4B shows Case B, in which each of the base stations in the cells 45-i is assumed to include a 16 Watt amplifier, and the total receive path attenuation value in the test set-up of FIG. 2 remains set to 10 dB. In this case, the signal-to-interference ratio $E_c/I_0$ at the test mobile 32 for sector S1 is given by:

$$\frac{E_c}{I_0} = \frac{2*Sf1}{(2*(S1 + S2 + S3 + S4 + \ldots) + \text{Thermal Noise})}$$

FIG. 4C shows case C, in which the same sector S1 signal-to-interference ratio $E_c/I_0$ as Case B is produced not by doubling the amplifier power in each of the cells 45-i, but instead by decreasing the value of the total receive path attenuation in the test mobile 32 by 3 dB. It is therefore apparent that the total receive path attenuation value in test set-up 30 can be used to simulate a system-wide increase in base station amplifier power.

As noted above, the test set-up 30 can increase the reverse link path loss independently of the forward link receive path. The test set-up 30 can therefore be used to characterize the performance of the reverse link for a system with a larger cell size, without any alteration in the actual size of the existing cells. For example, if one would like to test the performance of a proposed system in which existing cell size is increased such that the mobile-to-base reverse link is "stretched" by an additional 3 dB, setting the total transmit path attenuation value to 3 dB will simulate such a system. The test set-up 30 thus allows performance to be measured for a variety of different system configurations without the need for a time-consuming, expensive and often highly impractical actual reconfiguration.

An exemplary performance measurement process will now be described illustrating use of the test set-up 30 to perform link performance measurements in an IS-95 CDMA PCS system such as that shown in FIG. 1. It will be assumed without limitation that the system is designed for in-building or in-vehicle coverage, and hence with some amount of margin, a maximum mobile transmit power of 23 dBm, and a mobile receiver sensitivity of approximately −104 dBm (which is the IS-95 current standard). Initially, a "drive route" is selected that passes through several cells of the system, such that a test mobile on this route will pass in and out of several different cell sectors. Thus, during the drive, the test mobile will spend some amount of time inside each of the several sectors, possibly in simplex connection with those sectors, and at other times it will be at the outer areas of those sectors, possibly in a hand-off mode with other cells or sectors. The selected drive route should cover the inner and outer parts of several cells, such that performance measures averaged over the drive route provide an accurate picture of system-wide performance. As the issue of link balance in a CDMA system can be related to mobile position, the above-described selection of drive route is an important aspect of this particular approach.

The system performance may then be measured for the forward and reverse links by: (1) setting the common-path pad 36 to a particular value, such as 10 dB, and setting the single-path pad 40 to zero, such that the forward and reverse links are evenly attenuated; (2) measuring the forward and reverse link system performance along the drive route for the corresponding receive path attenuation; (3) increasing the receive path attenuation by a designated amount, such as 4 dB, keeping all other system parameters unchanged; (4) measuring the forward and reverse link performance along the drive route for the increased receive path attenuation; and (5) repeating steps (3) and (4), increasing the receive path attenuation each time, until the forward link performance begins to degrade. The system performance in steps (2) and (4) may be measured in terms of frame error rate (FER) or other suitable parameters. As described previously, a decrease in receive path attenuation simulates a system-wide increase in base station amplifier power level, while an increase in transmit path attenuation simulates an increase in system cell size.

Upon the initial iteration of step (3) above, with the receive and transmit path attenuation values increased by about 4 dB relative to their values in step (2), it may be found that the FER performance of the forward and reverse links remains substantially unchanged. This invariance in performance is not unexpected. At the forward link mobile receiver, the additional 4 dB receive path attenuation essentially reduces the desired user power by 4 dB, but also reduces the power of the other system users (i.e., CDMA internal interference from the same sector and from other sectors/cells) by 4 dB. Provided that internal interference is much greater than the thermal noise floor, the system is interference limited, and an equal reduction in signal and noise will make substantially no difference in the performance of the system. The performance of the reverse link is similarly unaffected because the test set-up 30 can be seen as essentially increasing the reverse link path loss by 4 dB. If there is sufficient mobile transmit power available, power control functions in the system will act to provide the additional 4 dB of power, and the reverse link performance will remain substantially unchanged.

As the receive path loss and transmit attenuation values are increased in subsequent iterations of the above-described measurement process, the performance of the forward and reverse links will generally start to degrade. For example, at sufficiently transmit path attenuation values, the reverse link should start to degrade because the mobile transmitter will not have sufficient power to overcome the net (i.e., real plus pad-induced) reverse link path loss to the base station receiver. At the forward link mobile receiver, higher receive path attenuation values will eventually render thermal noise power comparable to CDMA internal interference power. At that point, the system is no longer interference limited, and further increases in receive path attenuation will result in a degradation of $E_c/I_0$ and a corresponding degradation in forward link performance.

Figure 5:
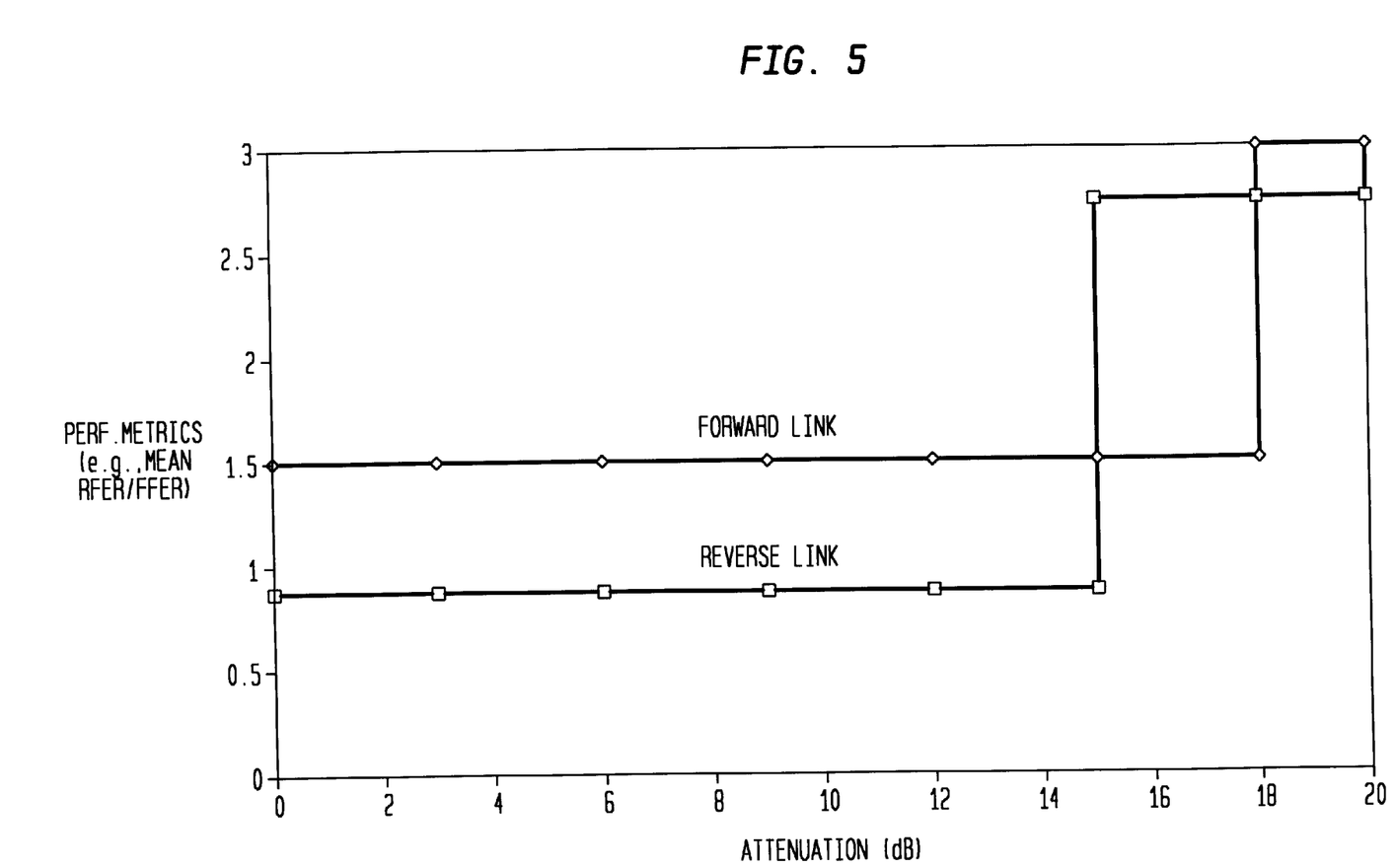
FIG. 5 is a plot of error rate for forward and reverse link performance in a hypothetical system configuration, illustrating link balance concepts in accordance with the invention.

FIG. 5 illustrates an important consideration involved in measuring link balance using the test set-up of FIG. 2 and the above-described measurement process. FIG. 5 plots the hypothetical performance of forward and reverse links as a function of the value of the total receive path attenuation pad value and total transmit path attenuation pad value. The performance is measured in terms of a performance metric such as mean forward FER and reverse FER for the respective forward and reverse links. The individual plots for the forward and reverse links are measured using the process described above, in which the value of the total receive path attenuation is increased while the total transmit path attenuation remains at a substantially lower value so as to maintain a strong reverse link. It can be seen from the hypothetical performance plots that forward link performance remains unchanged at 1.5% mean FFER until the receive path attenuation value is increased to 18 dB, at which point the mean FFER degrades by a factor of two to a mean FFER of 3.0%. For the reverse link, the performance remains unchanged at 0.9% mean RFER until a total transmit path attenuation pad value of 15 dB, at which point the mean RFER degrades to 2.7%. For this hypothetical case, the conclusion would be that the forward link is better by 3 dB as compared to the reverse link.

A 3 dB reduction in system-wide amplifier power would cause the forward link performance plot in FIG. 5 to shift to the left by 3 dB, such that the forward link would degrade to 3% FFER at a receive path attenuation value of 15 dB. As a result, the forward and reverse links would then degrade or "break" at the same attenuation value (i.e., 15 dB). In accordance with a preferred embodiment of the invention, this simultaneous "breaking" of both the forward and reverse links, rather than the actual FER steady-state performance, is used as an indicator of link balance. It should be noted that it is not the absolute value of the flat parts of the plots in FIG. 5 that is used to imply link balance (i.e., an asymptotic value of FFER greater than an asymptotic value of RFER does not imply a link imbalance). Link balance is instead determined by the point at which the performance begins to degrade for both forward and reverse links. In order to determine link balance in this manner, plots similar to those shown in FIG. 5 are obtained for the forward and reverse links, while unevenly attenuating the forward and reverse links using the pads 36, 40 of the test set-up 30 of FIG. 2. As previously noted, the test set-up 30 allows the forward and reverse link attenuation to be decoupled or isolated, such that performance of one link can be maintained at an acceptable level while the degradation point of the other link is determined.

Figure 6A:
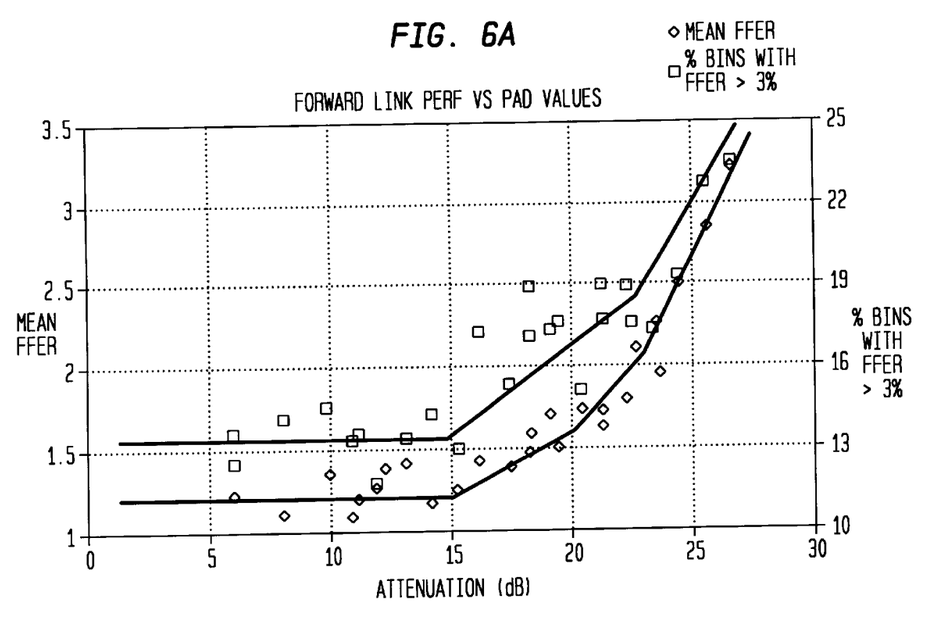
FIGS. 6A—6C are plots showing measurement results for forward link performance, forward link capacity and reverse link performance, respectively, in an exemplary measurement using the techniques of the invention.
Figure 6B:
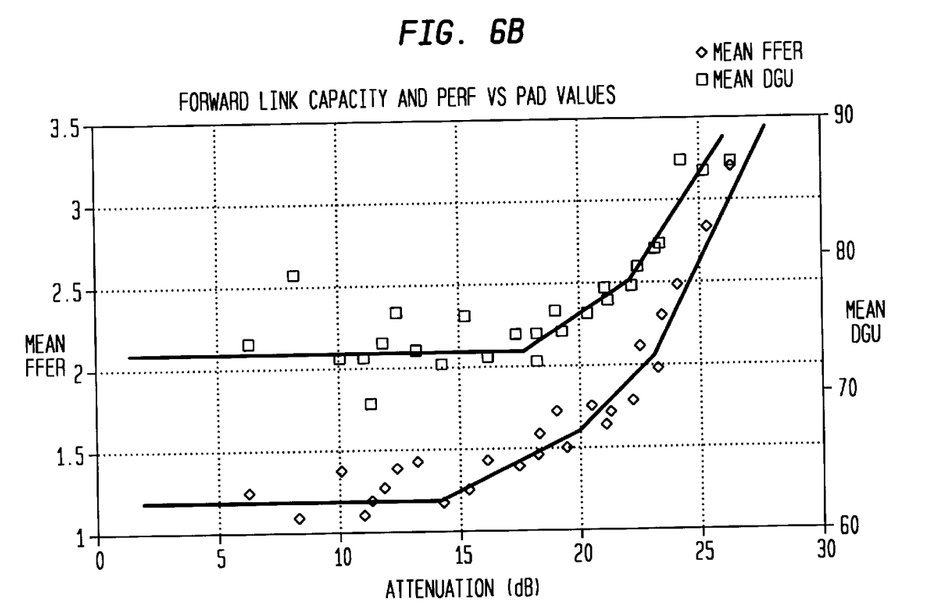
Figure 6C:
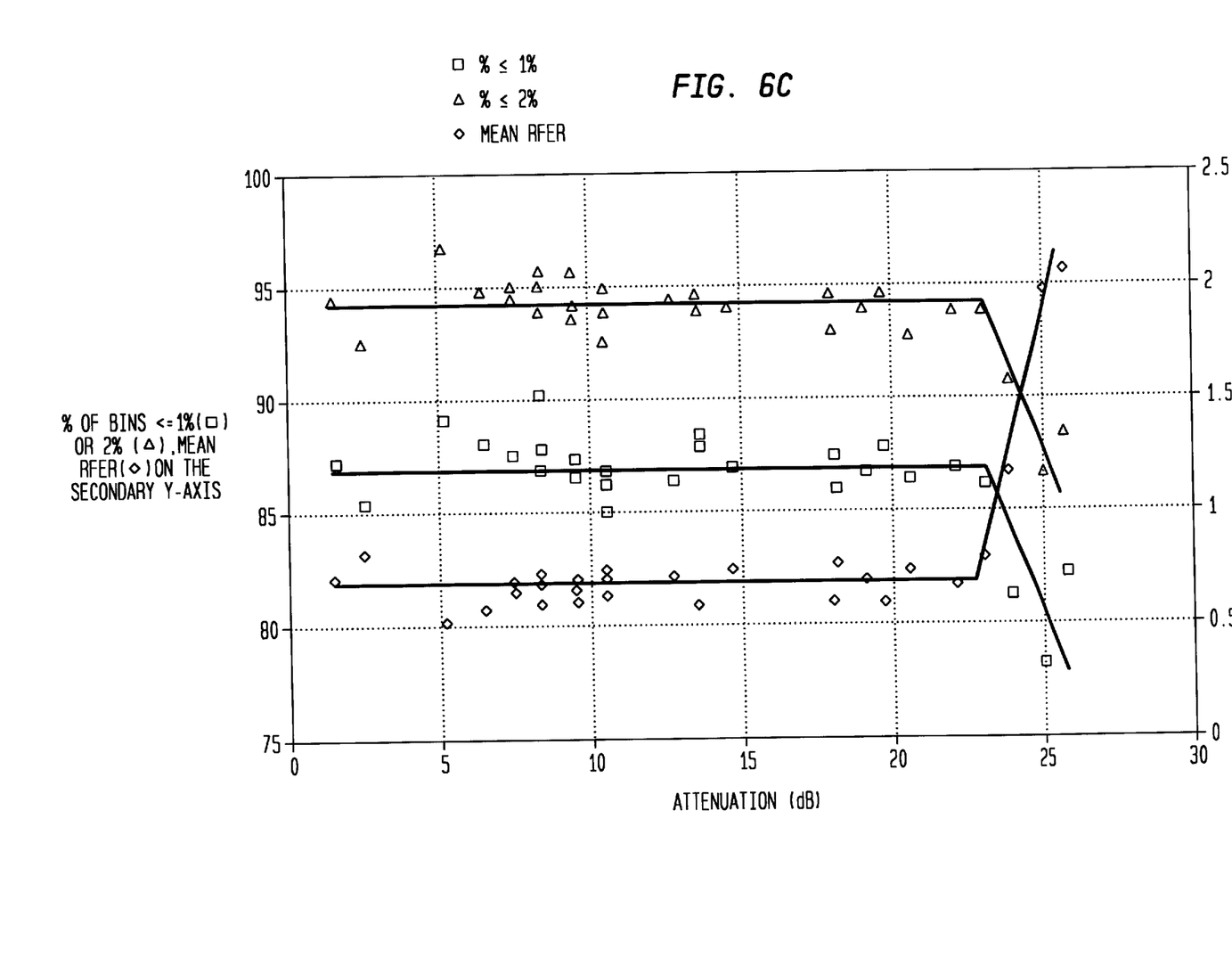

FIGS. 6A–6C illustrate forward and reverse link performance measurements conducted using the above-described techniques for an exemplary IS-95 PCS CDMA system with a maximum mobile transmit power of 23 dBm and a mobile receiver sensitivity of –104 dBm. The results shown are for a target FFER of 1%, and a target RFER of 1%. The test call used in the measurements was a full rate Markov call, such that the effective voice call target RFER is 0.5%. It is assumed that there is a system-wide other-channel noise simulator (OCNS) loading of 12 users at a digital gain unit (DGU) of 72 each, plus the test mobile with a full rate Markov call, making for a total of 14 users on the forward link. A matching load is assumed to be present on the reverse link. It should be noted that the straight lines drawn through the data points in FIGS. 6A–6C are for purposes of illustration and clarity only, and do not represent average values.

FIG. 6A shows the forward link performance results using the metrics of mean FFER and percentage of bins with FFER >3%, both as a function of the receive path attenuation value in dB. FIG. 6B shows a measure of forward link capacity using the metric of mean DGU plotted with the forward link performance in mean FFER, both as a function of the receive path attenuation value. FIG. 6C shows the reverse link performance results using the metrics of mean RFER, percentage of bins with RFER >1%, and percentage of bins with RFER >2%, all as a function of the transmit path attenuation value in dB. In the reverse link results, loading has been taken into account by shifting the results to the left by 3.5 dB, which corresponds to reverse link loading of approximately 55% of the pole point. It should be noted that reverse link pole point in a CDMA system depends on several parameters, such as the required reverse link $E_b/N_0$ required to achieve a specific targeted FER. Some of these parameters have small differences that are system link budget specific. Hence, there may be a small variation in the pole point value, as well as the receiver interference margin (also known as the noise rise), from one system implementation to another.

It can be seen from FIG. 6C that the loaded reverse link degrades relatively quickly beyond about 22–23 dB of transmit path attenuation. All of the three measures of reverse link performance shown in FIG. 6C degrade at about the same attenuation value, and therefore mean RFER will be used as a benchmark of reverse link performance in the remaining description. In contrast to the reverse link results of FIG. 6C, the forward link performance and capacity as shown in FIGS. 6A and 6B has a relatively smooth degradation, which makes it more difficult to determine a forward link "break point." However, the performance and capacity metrics in FIGS. 6A and 6B (i.e., mean FFER and % bins >3% for performance, and mean DGU for capacity) all degrade similarly.

Figure 7:
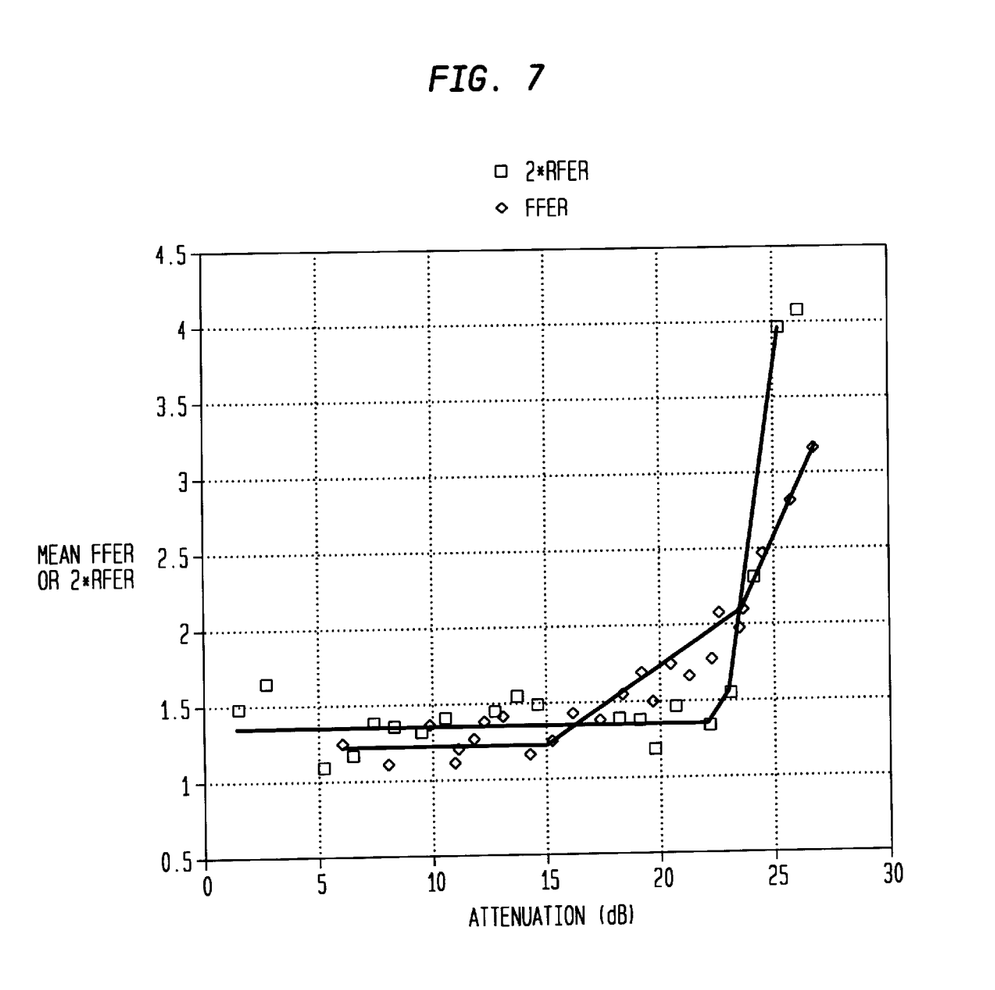
FIG. 7 shows a comparison of forward and reverse plots for use in determining a link balance condition in accordance with the invention.

FIG. 7 plots forward and reverse link performance taken from FIGS. 6A–6C on the same scale. This plot can be used to estimate the affect of certain system configuration changes on forward and reverse link performance. In order to provide an appropriate comparison, the reverse link results have been multiplied by a factor of two, because the effective target FER on the reverse link is essentially 0.5% for a full rate Markov call. It can be seen from FIG. 7 that about 4 to 6 dB before the reverse link "breaks," performance on the forward link starts to degrade gradually. Once the reverse link degrades, its degradation is quite fast. The forward and reverse link plots cross at approximately 2% FER, which is twice the target rate, at an attenuation value of about 23 dB, and thereafter begin to assume more similar characteristics. It should be noted that, although it was not necessary in this example, the transmit path attenuation in the test set-up 30 could be increased while leaving the receive path attenuation constant if the reverse link had not begun to degrade at approximately the same point as the forward link.

The above-described test set-up and measurement process can be used to determine the impact of changes in system configuration, such as a system-wide increase in base station transmit power. For example, a system-wide increase of 3 dB or 5 dB in base station transmit power would shift the FFER curve in FIG. 7 to the right by 3 dB or 5 dB, respectively. The shape of the link balance plot in FIG. 7 indicates that additional forward link amplifier power would probably be of marginal value in the system. For example, assume that 3 dB of additional amplifier power is added by replacing all 8 Watt average power base station transmit amplifiers in the system with 16 Watt average power amplifiers. This change will shift the forward link performance curve to the right by 3 dB. However, this extra 3 dB will impact only the most disadvantaged mobiles: the average FFER will be reduced by about 0.35% (from about 1.9% to 1.55%), and the mean DGU will be reduced by about 5%, at the point where the reverse link starts to break (i.e., about a 22 dB attenuation value). This very marginal performance improvement for all the mobiles as a whole probably does not warrant the additional 3 dB amplifier power. Other techniques, such as local use of 16 Watt average power amplifiers in specific sectors or cells, may be a more cost-effective solution. The forward and reverse link performance measurements conducted using the test set-up 30 of FIG. 2 allow this determination to be made with minimal expense and system reconfiguration. Similar measurements can be used to provide insight into other potential design changes for a given system.

The above-described embodiments of the invention are intended to be illustrative only. Alternative embodiments could perform other types of link performance measurements, and could use other mechanisms to decouple attenuation values for the forward and reverse links. For example, the circulator in the test set-up of FIG. 2 could be replaced with a suitable filter or filters which separate the transmit and receive paths. These and numerous other alternative embodiments within the scope of the following claims will be apparent to those skilled in the art.

What is claimed is:

1. A method of measuring link performance in a wireless communication system in which a mobile station communicates with a base station, the method comprising the steps of:

inserting a first attenuator in a common portion of a transmit path and a receive path of the mobile station, and a second attenuator in one of: (i) a transmit-only portion of the transmit path, and (ii) a receive-only portion of the receive path, such that a different amount of attenuation can be provided on the transmit path than on the receive path; and measuring performance of the system while varying a value of at least one of the first and second attenuators so as to simulate a reconfiguration of a plurality of base stations of the system.

2. The method of claim 1 wherein the inserting step includes inserting a first variable attenuator in the common portion of the transmit path and the receive path, and inserting a second variable attenuator in one of a transmit-only portion of the transmit path and a receive-only portion of the receive path.

3. The method of claim 1 wherein a value of at least one of the first and second attenuators is selected to simulate performance of the system in a configuration in which base station amplifier power is altered relative to that of an existing system configuration.

4. The method of claim 1 wherein a value of at least one of the first and second attenuators is selected to simulate performance of the system in a configuration in which cell size is increased relative to that of an existing system configuration.

5. The method of claim 1 wherein the measuring step further includes measuring the performance of a forward link of the system while varying the value at least one of the first and second attenuators.

6. The method of claim 1 wherein the measuring step further includes measuring the performance of a reverse link of the system while varying the value at least one of the first and second attenuators.

7. The method of claim 1 wherein the measuring step includes determining a link balance condition for forward and reverse links of the system by varying a value of only one of the first and second attenuators while keeping a value of the other attenuator constant.

8. An apparatus for measuring link performance in a wireless communication system in which a mobile station communicates with a base station, the apparatus comprising:

a first attenuator arranged in a common portion of a transmit path and a receive path of the mobile station; and a second attenuator arranged in one of: (i) a transmit-only portion of the transmit path, and (ii) a receive-only portion of the receive path, such that a different amount of attenuation can be provided on the transmit path than on the receive path, and wherein performance of the system is measured while varying a value of at least one of the first and second attenuators so as to simulate a reconfiguration of a plurality of base stations of the system.

9. The apparatus of claim 8 wherein the system is a code division multiple access (CDMA) system.

10. The apparatus of claim 8 further including:

an antenna;

a mobile receiver coupled to the antenna; and a circulator connected between the mobile receiver and the antenna, wherein the first attenuator is connected in the common portion of the receive and transmit paths in series between a port of the circulator and the antenna, and the second attenuator is connected in a path in parallel with the circulator.

11. The apparatus of claim 8 wherein the first and second attenuators are variable attenuators.

12. The apparatus of claim 8 wherein a value of at least one of the first and second attenuators is selected to simulate performance of the system in a configuration in which base station amplifier power is altered relative to that of an existing system configuration.

13. The apparatus of claim 8 wherein a value of at least one of the first and second attenuators is selected to simulate performance of the system in a configuration in which cell size is increased relative to that of an existing system configuration.

14. The apparatus of claim 8 wherein the performance of a forward link of the system is measured while varying the values of at least one of the first and second attenuators.

15. The apparatus of claim 8 wherein the performance of a reverse link of the system is measured while varying the value of at least one of the first and second attenuators.

16. The apparatus of claim 8 wherein a link balance condition is determined for forward and reverse links of the system by varying a value of only one of the first and second attenuators while keeping a value of the other attenuator constant.

17. A mobile station for use in a wireless communication system, comprising:

an antenna;

a mobile receiver coupled to the antenna;

a circulator connected between the mobile receiver and the antenna;

a first attenuator connected between a port of the circulator and the antenna; and a second attenuator connected in a path in parallel with the circulator, wherein the first and second attenuators are arranged such that a different amount of attenuation can be provided on a transmit path of the mobile station than on a receive path of the mobile station.

18. The mobile station of claim 17 wherein the second attenuator is connected in a transmit-only path in parallel with the circulator.

19. The mobile station of claim 17 wherein the second attenuator is connected in a receive-only path in parallel with the circulator.

20. A method of measuring link performance in a wireless communication system in which a mobile station communicates with a base station, the method comprising the steps of:

selecting a first amount of attenuation in a common portion of a transmit path and a receive path of the mobile station; and selecting a second amount of attenuation in one of: (i) a transmit-only portion of the transmit path, and (ii) a receive-only portion of the receive path, such that the selected amounts of attenuation simulate a reconfiguration of a plurality of base stations of the system.

21. A method of measuring link performance in a wireless communication system in which a mobile station communicates with a base station, the method comprising the steps of:

decoupling an amount of attenuation provided on a transmit path of the mobile station from an amount of attenuation provided on a receive path of the mobile station, such that a different amount of attenuation can be provided on the transmit path than on the receive path; and varying the amount of attenuation provided on at least one of the transmit path and the receive path to simulate a reconfiguration of a plurality of base stations of the system.

22. An apparatus for measuring link performance in a wireless communication system in which a mobile station communicates with a base station, the apparatus comprising:

a transmit path associated with the mobile station; and a receive path associated with the mobile station, the transmit path including an amount of attenuation which is decoupled from an amount of attenuation on the receive path, such that varying the amount of attenuation on at least one of the transmit path and the receive path simulates a reconfiguration of a plurality of base stations of the system.

23. An apparatus for measuring link performance in a wireless communication system in which a mobile station communicates with a base station, the apparatus comprising:

a first attenuator arranged in a common portion of a transmit path and a receive path of the mobile station;

a second attenuator arranged in one of: (i) a transmit-only portion of the transmit path, and (ii) a receive-only portion of the receive path, such that a different amount of attenuation can be provided on the transmit path than on the receive path, and wherein performance of the system is measured while varying a value of at least one of the first and second attenuators;

an antenna associated with the mobile station;

a mobile receiver associated with the mobile station and coupled to the antenna; and a circulator connected between the mobile receiver and the antenna, wherein the first attenuator is connected in the common portion of the receive and transmit paths in series between a port of the circulator and the antenna, and the second attenuator is connected in a path in parallel with the circulator.

* * * * *